Figure 2:
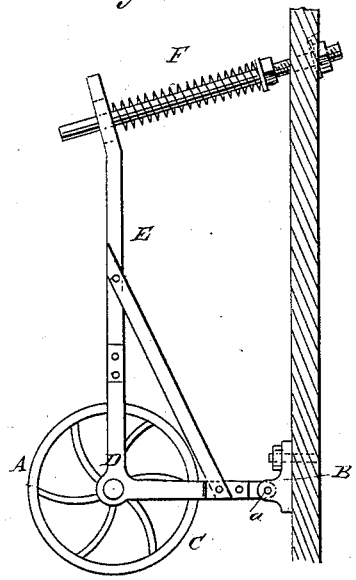

(No Model.)  2 Sheets—Sheet 1.

N. YAGN.
DEVICE FOR TRANSMITTING POWER BY BELTS AND PULLEYS.

No. 308,588. Patented Nov. 25, 1884.

WITNESSES:
Chas. Nida.
C. Sedgwick

INVENTOR:
N. Yagn
BY Munn & Co.
ATTORNEYS.

(No Model.) 2 Sheets—Sheet 2.

N. YAGN.
DEVICE FOR TRANSMITTING POWER BY BELTS AND PULLEYS.

No. 308,588. Patented Nov. 25, 1884.

WITNESSES:
Chas. Nida
C. Sedgwick

INVENTOR:
N. Yagn
BY Munn & Co.
ATTORNEYS.

UNITED STATES PATENT OFFICE.

NICHOLAS YAGN, OF ST. PETERSBURG, RUSSIA.

DEVICE FOR TRANSMITTING POWER BY BELTS AND PULLEYS.

SPECIFICATION forming part of Letters Patent No. 308,588, dated November 25, 1884.

Application filed June 27, 1884. (No model.) Patented in France March 10, 1884, No. 160,830.

*To all whom it may concern:*

Be it known that I, NICHOLAS YAGN, a subject of the Czar of Russia, and residing in St. Petersburg, Russia, have invented certain Improvements in the Method of Transmitting Power by Belts and Pulleys, of which the following is a specification.

This invention relates to a new method of transmitting power by belts and pulleys, whereby either belts of smaller width than hitherto employed may be used for transmitting the same power or greater power transmitted by belts of the customary width. It also affords an easy means for preventing belts from slipping and for interrupting the transmission of power instantaneously.

For the purpose of thoroughly explaining the substance of my invention, I will shortly refer to the present mode of transmitting power by belting.

In order to transmit a force—that is, a given number of foot-pounds divided by the velocity of the belt in feet—from the circumference of one pulley to the circumference of another one, the belt must have a tension great enough to create the necessary amount of friction on the pulley, without which the belt would slip. The tension is greater than the force transmitted by the belt, and its amount varies with the length of that part of the circumference of the pulley that is in contact with the belt. This length is equal to half the circumference if both pulleys are of equal diameter, and may vary according to the difference of diameters and distance between the pulleys. The smaller is the length of the arc in contact with the belt on one pulley the higher must be the tension, in order to prevent the belt from slipping on the smaller pulley, and with the present practice the belt must be made of double width or of double thickness, in order to withstand the strain put upon the tension.

In using the appliance which constitutes my invention, and which will be explained hereinafter, the dimensions of the belt depend only upon the load transmitted, and the additional tension of the belt is entirely done away with, thereby allowing of the use of belts from one-half to three-fourths times smaller than those used at present, and for high speeds admit of a still greater saving, because high-speed belts, with the present method, must be made much wider than is given above, in order to prevent slipping, while their width need not be increased if my belt-economizers are used. This result is obtained by pressure-rollers pressing the belt against the pulley at any point where the belt is in contact with the pulley; but the greatest economy is obtained if the roller is placed on the driving-pulley at or near to that point where the belt leaves it, and on the driven pulley at or near the point where the belt meets its circumference.

Figure 1:
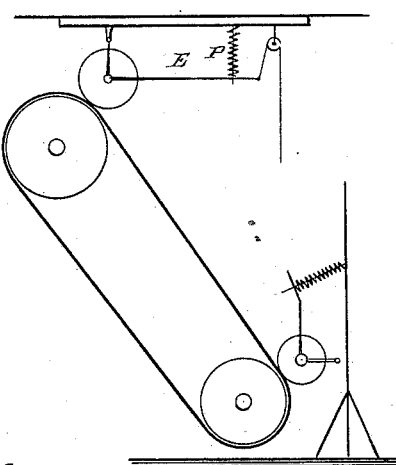
Figure 3:
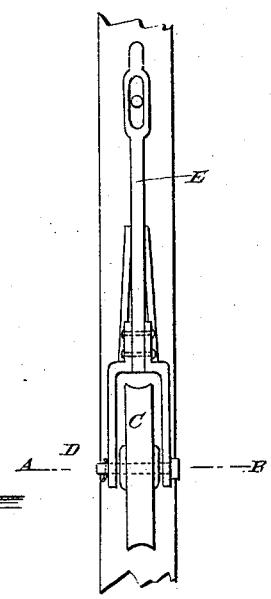
Figure 4:
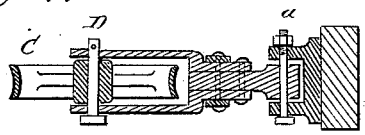

Figure 1 of the annexed drawings is a diagram showing this arrangement. Fig. 2 is a side view of one form of my pressure-roller. Fig. 3 is a front view of same. Fig. 4 is a transverse section on the line A B, Fig. 3.

The roller C runs in bearings D, fixed to the crank-lever E, pivoted at *a*. A spring, F, placed at any point of the lever, presses the lever and roller against the belt and creates friction between the latter and the pulley. Once the belt is sufficiently jammed at that one point it will not slip. A roller may be pressed against the pulley by means of a weight or a spring, but preferably springs are to be used, because they give a smoother motion. Weights produce a hammering action and destroy the belt if it has not exactly the same thickness throughout.

The rollers may be made of wood or metal, and be lined or not with any softer material—say leather or cloth—on their circumference. In most cases one roller is to be placed opposite the driving-pulley and another one opposite the driven pulley; but if one pulley is much smaller than the other it will in many cases be found quite sufficient to use one roller opposite the smaller of the two pulleys.

Figure 6:
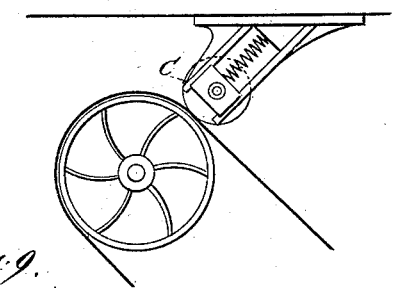

The form of the lever, its point of suspension, and the point which the spring or weight acts upon may be varied to suit the requirements of any given case, and the lever may be done away with altogether if the weight or spring act directly upon the roller, as in Fig. 6. If small powers have to be transmitted, the weight of the roller itself may create the necessary friction without the addition of a weight or a spring.

It is to be observed that my roller or belt-economizer has nothing in common with the ordinary tension-roller used now for increasing the tension of the belt, and placed for that purpose between the pulleys.

The principle and mode of action of both kinds of rollers are diametrically opposed to each other. The ordinary tension-roller creates tension, my economizer does away with it; the tension-roller is placed between the pulleys, my economizer just opposite to them; the belt with the present method must have a certain tension on the off side of the driving-pulley, whether the tension-roller be used or not, but if my economizer is used, the belt may hang quite loosely on one side; and last, but not least, the pressure on the journals of both pulleys is increased by the ordinary tension-roller, while it is diminished by the use of my economizer, as can be shown by a plain calculation and actual practice.

Figure 5:
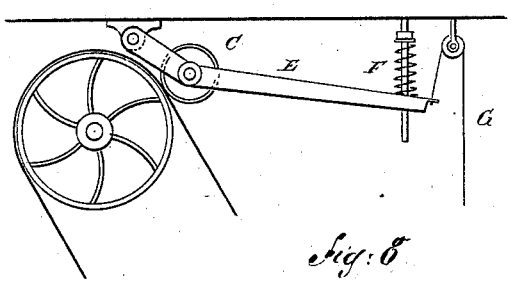
Figure 10:
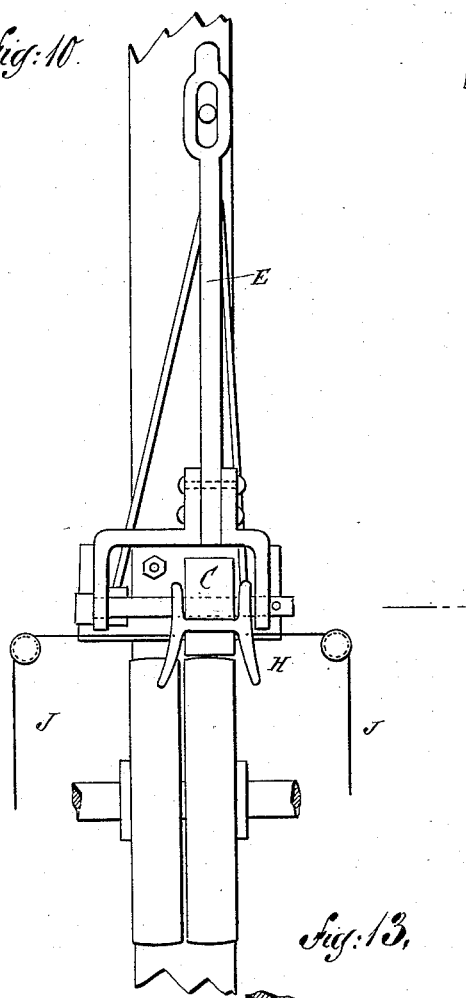
Figure 11:
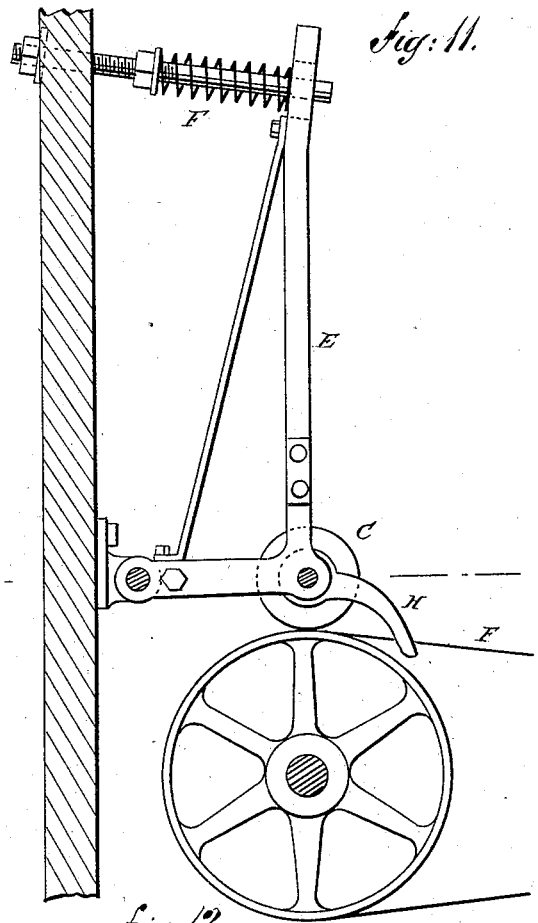
Figure 12:
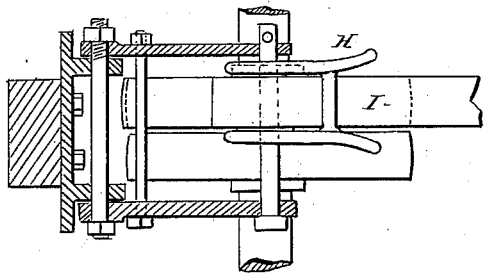

The roller C may be lifted from its place by a rope, G, as shown in Fig. 5, or by a lever and handle, and the transmission of power be interrupted instantaneously, because the belt or rope will slip on the pulley as soon as the pressure of the roller is taken off. This does away with the necessity of having a loose pulley alongside of the fast one and causes a saving in pulleys. If, however, the use of fast and loose pulleys is preferred, then the pressure-roller may be applied as shown in Figs. 10, 11, and 12, of which Fig. 10 is a front view of this arrangement, Fig. 11 is a side view of same, and Fig. 12 is a plan partly in section. The roller C is made to slide freely on its axis, and is guided by a fork, H, which embraces also the belt I, and is drawn to the right or to the left by cords J or by other suitable means.

Figure 13:
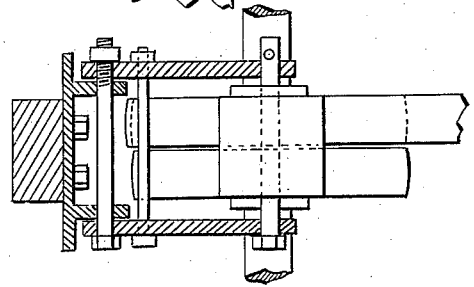

Fig. 13 shows a roller having the same width as the fast and loose pulleys together, which roller may be employed instead of a sliding one.

It is obvious that the arrangement shown in Fig. 5 may be used in combination with fast and loose pulleys, because after the roller C has been lifted from the belt the latter may be easily shifted from the fast pulley to the loose one, and vice versa.

Figure 7:
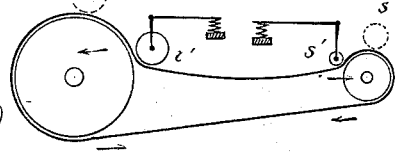

In some cases it may be useful to increase the surface of the pulley that is in contact with the belt, in order to increase its friction. This may be easily done by my pressure-rollers if they are placed in such a position as to make the belt surround more than one-half of the pulley's circumference, as shown in Fig. 7 by dotted lines. In this case the belt may still hang quite loosely between the pressure-rollers $r$ and $s$, and the pressure on the rollers $r$ and $s$ may be made much smaller than on the rollers $r'$ and $s'$; but still the belt will not slip, owing to the greater length of its bearing on the pulley. This arrangement has the additional advantage that it decreases the pressure, and consequently the friction, of the pulley-shaft journals in their bearings, because the pressure-roller will press against them in a direction opposite to the strain of the belt, as shown in the drawings, Fig. 7, by the two arrows.

Figure 8:
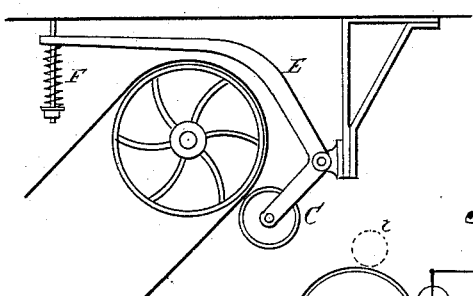
Figure 9:
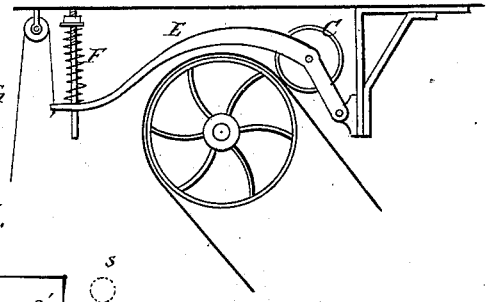

Figs. 8 and 9 show various modifications in the arrangement of my pressure-roller apparatus according to different positions of pulleys.

Having thus fully described my invention, I claim as new and desire to secure by Letters Patent—

1. In combination with the power-transmitting pulley and belt, a pressure-roller arranged on a crank-lever and pressing the belt against the pulley by the action of a spring applied to the longer arm of the crank-lever, substantially as shown and described.

2. In combination with the power-transmitting pulley and belt, a pressure-roller pivoted to a crank-lever and arranged to be lifted from the belt, said lever being acted upon by a spring, substantially as and for the purpose described.

3. In combination with fast and loose pulleys and a power-transmitting belt, a pressure-roller sliding on its axis and arranged to be shifted with the belt by means of a guiding-fork, substantially as described and shown.

4. In combination with the fast and loose pulleys and a power-transmitting belt, a pressure-roller of double the width of each of the pulleys, substantially as described and shown.

In testimony whereof I have signed my name to this specification in the presence of two subscribing witnesses.

NICHOLAS YAGN.

Witnesses:
ROBT. M. HOOPER,
ALBERT MOREAU.